Figure 1:
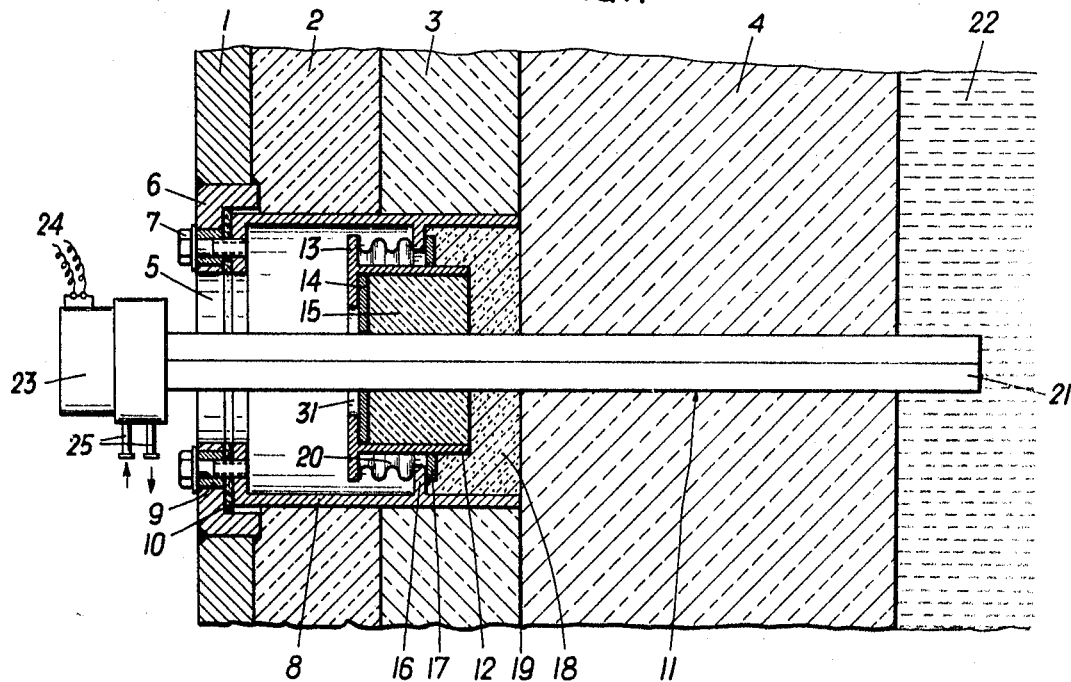

United States Patent

[11] 3,598,380

[72] Inventors Walter Jilek;
 Wilhelm Muller, both of Linz, Austria
[21] Appl. No. 882,075
[22] Filed Dec. 4, 1969
[45] Patented Aug. 10, 1971
[73] Assignee Vereinigte Osterreichische Eisen-und
 Stahlwerke Aktiengesellschaft
 Linz, Austria
[32] Priority Dec. 19, 1968
[33] Austria
[31] 12343/68

[54] DEVICE FOR INSERTING MEASURING INSTRUMENTS INTO A METALLURGICAL VESSEL
5 Claims, 2 Drawing Figs.
[52] U.S. Cl. ............ 266/1 R, 266/41, 73/343
[51] Int. Cl. ............ F27d 21/04
[50] Field of Search. ............ 122/6.6, 110/182.5; 266/1 R, 34 R, 34 A, 34 T, 41, DIG. 3, DIG. 4, DIG. 5, DIG. 6; 73/343

[56] References Cited
UNITED STATES PATENTS
2,480,394 8/1949 Cavers et al. ............ 110/182.5
2,542,029 2/1951 Hoffert ............ 266/41
3,216,713 11/1965 Imaida et al. ............ 266/34
3,466,929 9/1969 Fischer ............ 266/35

Primary Examiner—Gerald A. Dost
Attorney—Steinberg & Blake

ABSTRACT: The invention relates to a device for inserting measuring instruments into a metallurgical vessel. The measuring instrument which may comprise a guiding tube containing a thermocouple serving to measure the bath temperature or a measuring rod serving to measure the conductivity of the metal bath, penetrates the shell and the refractory lining of the metallurgical vessel and is supported by a bushing which is inserted in the vessel shell and penetrates the outer lining and the rammed lining, said measuring instrument being connected to the bushing by means of wave compensating means, e.g., concertina walls extending between annular flanges provided on the bushing and on a sleeve surrounding the measuring instrument, respectively. In the area of the rammed lining the interspace between the bushing and the measuring instrument is filled with particulate refractory material. The new arrangement affords the great advantage that the measuring instrument may follow the movements of the inner lining in any direction without being subjected to shearing stresses.

PATENTED AUG 10 1971  3,598,380

INVENTORS
WALTER JILEK AND
BY WILHELM MULLER
Steinberg & Blake
attys

DEVICE FOR INSERTING MEASURING INSTRUMENTS INTO A METALLURGICAL VESSEL

The present invention relates to a device for inserting measuring instruments into a metallurgical vessel comprising a guiding tube or measuring rod penetrating the shell and the refractory lining of the metallurgical vessel.

When metallurgical processes are carried out, e.g. when pig iron is refined in converters, it is endeavored to supervise the process in all phases and to control it with the aid of the obtained data. A suitable method for supervising the progress of the refining process resides in continuously measuring the temperature of the hot metal in the converter and in recording it. Valuable information on the condition or the progress of the process, respectively, may also be obtained from measurements on the conductivity.

It has already been proposed to guide a measuring lance with a thermocouple or a metal ceramic measuring rod into which a thermocouple is sintered laterally through the shell and the refractory lining of a converter below the bath level into the hot metal. This, however, presents some difficulties. If measuring devices supplying electrical current are used, it is necessary to insulate the installation against the converter shell. In the case of vessels having a tarviated or tar impregnated lining the guiding tube or measuring rod has to be built in with a gastight seal so as to prevent the escape of tar vapors which would shorten the life of the degasified zone of the refractory lining; further, tar deposits caused by condensation at the contact areas of the electrical measuring device on the vessel shell would impair the accuracy of the recorded values.

When measuring process data a great problem is presented by the fact that the individual layers of the refractory lining, i.e. the outer lining, the rammed lining and the inner lining, are displaced during heating and operation of a converter, which displacements will damage or deform a guiding tube or measuring rod guided laterally through the brickwork.

The invention is aimed at avoiding these disadvantages and difficulties and in a device of the above defined kind resides in that the guiding tube or measuring rod, respectively, is resiliently fixed by means of a wave compensator or concertina walls to a bushing which is inserted in the converter shell and penetrates the outer lining and the rammed lining so that the guiding tube or measuring rod, respectively, may follow movements of the inner lining perpendicularly to the axis of the guiding tube or measuring rod, respectively.

The guiding tube or measuring rod may be fastened to the bushing by means of annular flanges between which the concertina walls are arranged, said concertina walls being situated between the converter shell and the inner side of the rammed lining.

Suitably the interspace or part of the interspace between the bushing and the guiding tube or measuring rod in the area of the rammed lining is filled with particulate, refractory material, such as magnesite powder, which may yield to movements of the guiding tube or measuring rod.

According to a preferred kind of support the guiding tube or measuring rod may be connected by means of ramming mass to a sleeve having an annular flange which, in turn, is connected via the concertina walls to a counter flange of the bushing. In order to render the whole arrangement gastight, additional disklike sealings made of asbestos or the like may be provided between the guiding tube and the annular flange of the sleeve as well as between the sleeve and the counter flange of the bushing.

The device according to the invention may be used both for guiding tubes containing thermocouples serving to measure the temperature as well as for measuring rods serving to measure the conductivity of the bath. It is capable of following different movements of the individual layers of the refractory lining in an oxygen converter without the danger of being damaged or deformed; it is completely gastight and electrically insulated against the converter shell.

Figure 2:
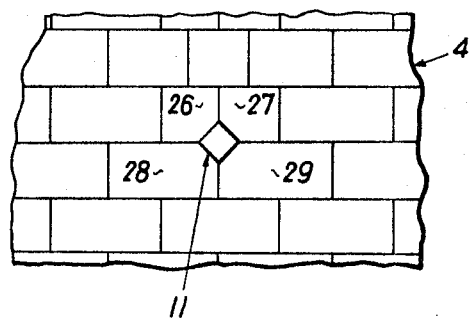

In order that the invention may be more fully understood an embodiment thereof will now be explained by reference to the accompanying drawing, in which FIG. 1 is a vertical sectional view showing a converter wall with inserted measuring rod;

FIG. 2 is a view of the built-in measuring instrument from the interior of the converter.

In FIG. 1 numeral 1 denotes the converter shell made of steel sheet, which is provided with a refractory lining comprising three layers. The layer indicated by 2 is the outer lining (permanent lining), the layer indicated by 3 is the rammed layer, and the layer indicated by numeral 4 is the inner lining (wear lining). In the converter shell an opening 5 is provided into which a flange ring 6 is welded to be gastight. A bushing 8 is fastened to the ring 6 by screws 7 which bushing penetrates both the outer and the rammed lining but not the inner lining. The screws are insulated by means of electrically insulating sleeves 9, which e.g. may be made of Bakelite, against the flange ring 6. Numeral 10 denotes another gastight, electrically insulating sealing, made e.g. of asbestos. A measuring rod 11 is inserted in the bushing 8, which rod has an approximately square cross section and is destined to measure the conductivity. Instead of the measuring rod also a guiding tube for a thermocouple may be inserted. The measuring rod 11 is fixed to the bushing 8 in the following manner: it is surrounded by a relatively short sleeve 12 which comprises an annular flange 13, a disklike sealing 14 being apposed to said annular flange. The space between the measuring rod and the inner wall of the sleeve is filled by ramming mass 15 which thus connects the measuring rod with the sleeve. The bushing 8 carries a counter flange 16 extending towards the interior; a further disklike sealing 17 is apposed to this counter flange so as to form a free annular space 18 between the measuring rod 11, the inner wall of the bushing 8 and the wall 19 of the inner lining. This space is filled with granular, refractory material, e.g. magnesite powder, which is not compressed upon movements of the measuring rod. Concertina walls or a wave compensator 20 is arranged between the inwardly projecting flange 16 of the bushing 8 and the annular flange 13 of the sleeve 12. The tip 21 of the measuring rod projects into the hot metal 22. The opposite end of the measuring rod situated outside the converter jacket is provided with a cooling arrangement 23. The measuring wires leading to a recording device are indicated by numeral 24; numeral 25 denotes water supply and draining tubes.

FIG. 2 shows a particularly advantageous arrangement of the measuring rod 11 between the bricks 26, 27, 28, 29, whose joints coincide with the diagonals of the square of the rod cross section so that shocks caused by falling pieces of scrap are mitigated. Vertical and horizontal forces are in a way reduced by the joints.

The device functions as follows: When the inner lining is displaced with regard to the rammed lining the measuring rod may follow this movement. If the measuring rod were rigidly fixed in the area of the outer lining and the rammed lining, it would be subjected to shearing stresses upon displacement of the inner lining 4 in upward or downward direction (occurrence of vertical forces) or in a transverse direction on occurrence of horizontal forces. As a result of such stresses the measuring rod would break in the area of a partition plane between rammed and inner lining. Supported according to the invention, the measuring rod may, however, follow the movements of the inner lining in any direction without being subjected to shearing stresses.

The device according to the invention may also follow changed conditions when the inner lining has increasingly been worn; when the inner lining is completely worn—apart from the fact that the measuring device would no longer work—a weak spot would form in the brickwork in the area of the installation. With increasing wear the zone of highest temperature is gradually shifted towards the cold end of the measuring rod, i.e. before the inner lining is completely worn, the rammed lining and the particulate, refractory material are gradually heated to the sintering temperature. A ceramic bond will result so that the steel is prevented from breaking out.

It is impossible for tar vapors to escape from the inner lining as they are retained by the compact ramming mass on the one hand and the wave compensator on the other hand. The tar vapors which might perhaps escape from the rammed lining into the open are prevented from doing so by the sealing.

By providing the annular flange 13, the sleeve 12 and the play 31 with appropriate dimensions, it becomes possible to employ measuring rods or guiding tubes with different diameters or cross sections, respectively, or to exchange them quickly.

In the embodiment represented herein the device according to the invention is mounted and removed from the interior of the converter whenever the converter is newly lined. However, in the case of a different design of the flange ring 6 and the bushing 8 with flanges extending to the outside, mounting and removal may also be carried out from the outside.

What we claim is:

1. A device for inserting immersed rod-type measuring instruments into a metallurgical vessel having a shell and a refractory lining composed of inner lining, rammed lining and outer lining, comprising a bushing inserted in said shell and penetrating said outer lining and said rammed lining, and wave compensating means for resiliently connecting said rod-type measuring instrument to said bushing so that the measuring instrument may follow movements of said inner lining perpendicularly to the axis of said measuring instrument.

2. The device set forth in claim 1, wherein said measuring instrument is fastened to said bushing by means of annular flanges extending from said bushing and from a sleeve surrounding said measuring instrument, respectively, said wave compensating means being arranged between said annular flanges, on the one hand, and between said shell and the inner side of said rammed lining, on the other hand.

3. A device for supporting a measuring instrument in a wall of a metallurgical vessel, said vessel having a shell and a multilayer refractory lining including an outer permanent lining, a rammed lining and an inner wear lining, and said measuring device having an elongated sensing member penetrating said vessel shell and lining and having its tip immersed in a medium contained in said vessel, said device comprising a sleeve engaging said elongated sensing member, a bushing inserted in said shell and extending through said outer and rammed linings, abutment means respectively provided on said sleeve and said bushing, and wave compensating means of the type including concertina walls mounted to extend between said respective abutment means, allowing said sensing member to follow any movements of said inner lining perpendicularly to the axis of said sensing member.

4. The device set forth in claim 3, wherein the interspace between said bushing and said sensing member in the area of said rammed lining is filled with particulate refractory material.

5. The device set forth in claim 3, wherein said sensing member is connected to said sleeve by means of ramming mass, said sleeve having an outwardly extending annular flange connected via said concertina walls to an inwardly extending flange on said bushing.